United States Patent [19]

Knorr

[11] 4,115,040
[45] Sep. 19, 1978

[54] PERMANENT MAGNET TYPE PUMP

[75] Inventor: Manfred Knorr, Bochum-Wattenscheid, Germany

[73] Assignee: Franz Klaus-Union, Germany

[21] Appl. No.: 800,219

[22] Filed: May 25, 1977

[30] Foreign Application Priority Data

May 28, 1976 [DE] Fed. Rep. of Germany ....... 2624058

[51] Int. Cl.² ............................................. F04B 17/00
[52] U.S. Cl. .................................. 417/420; 64/28 M; 192/84 PM; 310/104
[58] Field of Search ...................... 417/420; 64/28 M; 192/84 PM; 310/103, 104, 105

[56] References Cited

U.S. PATENT DOCUMENTS

| 3,299,819 | 1/1967 | McCoy | 417/420 |
| 3,378,710 | 4/1968 | Martin, Jr. | 417/420 |
| 3,411,450 | 11/1968 | Clifton | 417/420 |
| 3,647,314 | 3/1972 | Laessig | 417/420 |
| 4,013,384 | 3/1977 | Oikawa | 417/420 |
| 4,065,234 | 12/1977 | Yoshiyuki et al. | 417/420 |

FOREIGN PATENT DOCUMENTS 2,534,740  2/1977  Fed. Rep. of Germany .......... 417/420

Primary Examiner—C. J. Husar
Attorney, Agent, or Firm—Woodard, Weikart, Emhardt & Naughton

[57] ABSTRACT

Disclosed is a permanent magnet pump in which the pump impeller and the interior rotor of a permanent magnet driving means receives drive torque transmitted in synchronism by an exterior rotor. The exterior rotor is positioned, axially in one form and radially in another form, opposite the interior rotor with an air gap defined between them. Thin, plate-like permanent magnets carried by the rotors face each other across the air gap. The pump impeller shaft and the interior rotor are housed and supported in a common space which is sealed from the exterior by a partition of non-magnetizable material extending through the air gap.

8 Claims, 4 Drawing Figures

PERMANENT MAGNET TYPE PUMP

BACKGROUND OF THE INVENTION

The invention relates to a permanent magnet type pump, especially one that is made from plastics, and the pump impeller of which as well as the interior rotor of a permanent magnet drive, fixed for rotation with the impeller and receiving a drive torque of at least 1 meter kilogram (hereinafter abbreviated as m·kg) transmitted in synchronism by an exterior rotor which is driven by a motor and disposed axially or radially opposite the interior rotor, with an air gap defined between the same, are housed and supported in a common space which is sealed from the exterior by a partition of non-magnetizable material extending through the air gap, the interior and exterior rotors each being lined with a closed ring comprising the same even number of permanent magnets of alternating polarity. The invention relates particularly to the design of the driving clutch or permanent magnet drive means.

The known centrifugal pumps, especially those used in the chemical industry again and again cause problems with regard to the bearing and sealing as well as corrosion difficulties due to which the use of the pumps presents a more or less severe safety hazard, particularly when poisonous or precious media must be delivered. For this reason one had to put up with the fact that the bearings as well as the sealing elements had to be constantly checked. This applies to pumps having stuffing boxes or sliding ring seals as well as to the centrifugal pumps without stuffing boxes which have come to be used in the chemical industry during the past few years, especially the so-called gap-tube pumps as exemplified in U.S. Pat. No. 3,411,450.

As government imposed restrictions regarding emission are becoming stricter all the time, especially with regard to the pumping of poisonous substances, the difficulties become greater with the conventional sealing of centrifugal pumps used, among others, by the chemical industry. Recently attempts have been made to overcome the corrosion problem by making the least possible use of corrosion-resistant, expensive metallic materials and instead making the pumps entirely from plastic materials. This, however, causes further problems of design and construction because centrifugal pumps to be used for chemical purposes often must be designed for a drive power of approximately 5 kW or more, in part up to 100 kW and even higher. The drive power of very small pumps, such as used in washing machines or dishwashers, however, amounts only to approximately 0.1 to 0.5 kW. Therefore, it presented no problem to produce these gap-tube pumps entirely from plastics with inserted permanent magnets or magnet rings or discs (see U.S. Pat. Nos. 3,306,221 and 3,647,314).

It is a peculiar feature of the centrifugal pumps without stuffing boxes for chemical usage that the axial and radial bearings are lubricated by the medium being delivered. Centrifugal pumps without stuffing boxes may be divided into two structural groups:
1. Power transmission by an electrically induced field.
2. Power transmission by permanent magnets.

While in the first case of gap-tube pumps having a gap tube disposed in the air gap, the tube, which extends through the gap, is supported with respect to the stator of the motor and the interior rotor is supported within the range of the medium, the drive by means of a permanent magnet normally provides for use of a gap tube can in which the radial and axial bearings are housed at least in part. With both designs the air gaps are cylindrical. In the case of the permanent magnet drive means the permanent magnet driver (exterior rotor) is disposed in the atmosphere and driven by standardized electric motors. A special motor is required for the drive by means of an induced field type. Therefore, pumps with permanent magnet drive are the more important of the centrifugal pumps for the chemical industry.

With pumps driven by a permanent magnet the air gap between the interior and the exterior rotors on principle may be cylindrical and coaxial with the drive shaft or plane and radial. Other forms have been suggested as well. These fundamental structures may be provided either for vertical or horizontal arrangement of the pump shaft. In either case the interior rotor and the shaft must be guided and supported by means of bearings.

The invention relates only to a permanent magnet type pump, of the kind specified, made especially from plastics. However, the drive power of the pump may be very high, in the order of 10 kilowatts and more.

The interior and exterior rotors of known permanent magnet drives for permanent magnet type pumps have a single permanent magnet ring or individual rod or bar shaped magnets, short-circuit bodies and pole pieces of soft iron being provided to form a magnetic circuit. Other driving clutches comprising permanent magnets avoid this design principle and have the short-circuit bodies replaced by U-shaped magnets. It is also possible to provide U-shaped magnets which consist of permanent magnet bodies of opposed polarity connected at the backside by short-circuit bodies. In another permanent magnet drives the driving and the driven clutch halves are arranged co-axially or axially beside each other, at least one clutch half carrying rod-shaped magnets on its circumference which are so arranged that poles of the same polarity each are disposed adjacent each other and a ferromagnetic body acting as a pole piece is located between them. The other clutch half may be of the same design or consist of a disc of ordinary ferromagnetic material on which another disc of electrically conductive material is secured. It is a disadvantage of these known embodiments of pump drive means that the magnet length $h$, in other words the extension in the direction of the preferential magnetization, must be several times as long as the magnet width $b$ in order to avoid a low operating point on the demagnetization curve of the selected magnet material. This leads to very large dimensions of the magnet and to very great diameters of the system when high torques or drive powers must be transmitted. A stable value of the torque is obtained only after twisting or rotating the two clutch halves or the interior and exterior rotors relative to each other several times.

The drive component of permanent magnet type pumps provided with such permanent magnet driving clutches is not only very large and heavy but also extremely expensive. This restricts the torque to be transmitted by the known embodiments of permanent magnet type clutches for pumps to values of approximately 10 m·kg.

The heavy weight of the known drive means also produces very high centrifugal forces, especially when high numbers of revolution occur. Because of the unavoidable imbalances these great centrifugal forces have a disadvantageous effect especially on the necessary bearings.

Driving means of the kind specified are also used as overload protection means for sensitive machines and to drive agitators used for aggressive liquids and gases. In all cases of application it is required that the high driving torques be transmitted at the smallest possible system diameter.

Therefore, it is an object of the present invention to develop the drive means of the permanent magnet type pump specified initially so that a great synchronous torque can be safely transmitted even at high numbers of revolution.

It is another object of the invention to design the entire system so as to have a relatively small diameter.

It is also an object of the invention to warrant operational safety in the transmission of the torque at a relatively wide air gap of a few millimeters.

These and other objects which will become apparent as the description proceeds. These objects are met by the present invention in that the permanent magnets of the magnet ring, each forming a composed magnetic disc (FIG. 4) or a composed magnetic cylinder (FIG. 3), are thin magnet plates made from magnetic material containing an alloy of cobalt and rare earths and are positioned adjacent one another to contiguous relationship and magnetized in the direction in which the thickness of the air gap extends. They are embedded in non-magnetizable material, which may be metallic or plastic, and the magnet length $h$ (FIG. 2) extending in the direction of the thickness $z$ of the air gap is somewhat larger than the thickness $z$ of the air gap. The magnet width $b$ extending in the direction of the torque to be transmitted (direction of rotation) is much larger than the magnet length $h$. Preferably the magnet height $a$ (FIGS. 3 and 4) extending perpendicularly to the magnet length $h$, and magnet width $b$ is several times as large as the magnet length $h$. If one assumes the magnet length $h$ to be 1, the thickness of the air gap is approximately (0.8 to 0.9) $\cdot h$, whereas the magnet width $b$ may be approximately $3 \cdot h$ and the magnet height $a$ approximately $9 \cdot h$. It is also possible to provide a plurality of magnetic plates abutting each other without any spacing in between in the direction of the magnet height $a$.

The partition, which may be embodied by a tube in the case of a pump driven by a permanent magnet or which may be a radial plane bottom, preferably should have a high specific electrical resistance or be made from plastics. Therefore, only minor eddy currents are induced and consequently heating up is largely avoided during operational running and when the interior and exterior rotors fall out of step for a short time, if the embodiment comprises a non-magnetizable metallic partition. In the embodiment having a partition of plastics no eddy currents are induced at all and consequently no heating occurs. Pole numbers of 36, 24, 12, or 6 have proved to be particularly suitable for performance adaptation purposes. Such pole numbers are known per se.

In pumps having a permanent magnet drive the magnet plates, the thickness of which (magnet length $h$) is approximately 4 mm when the air gap provided for a certain pump size is only barely 4 mm, may be curved in the direction of the magnet width, in other words in the direction of rotation, and their curvature may correspond to the radius on which they are arranged. However, this does not have to be the case, especially not with larger diameters. They may also be designed as completely plane plates by virtue of their relatively small dimensions since the polygon which they form corresponds approximately to a cylindrical magnetic body.

Drive torques from 1 m·kg up to more than 60 m·kg can be realized with a pump according to the invention so that the pump is capable of handling considerable power. Thus pumps can be designed for an operating pressure of 4500 to 7000 psi, as required in some high pressure synthesis in the chemical industry. The many thin magnetic plates which are positioned adjacent one another to form the magnet rings (magnet disc or magnet cylinder) conveniently are embedded in a disc or drum of plastics or light metal. Magnet poles of alternating polarity are established beside one another on the peripheral surfaces of the cylindrical air gap facing each other or on the end surfaces of the interior and exterior rotors.

The permanent magnet type pump in accordance with the invention is suitable for the transmission of synchronous torques of more than 60 m·kg even at very high numbers of revolution because of the selected design of the magnets and the preferred lightweight structure. The stable value of the torque does not even change with several relative rotations between the two clutch halves.

Alloys of cobalt with rare earths present a material which is very well suited for the magnet plates. This magnetic material has the excellent magnetic properties required for permanent magnets in magnetic clutches, such as a very high anisotropic field strength and good magnetic stability.

The invention permits a compact and light structure of the drive means with the consequence that the centrifugal forces which occur with the unavoidable imbalances entail only relatively little stress of the pump bearings even at high numbers of revolution.

BRIEF DESCRIPTION OF THE DRAWINGS

The invention will be described further, by way of example, with reference to the accompanying drawings of two embodiments in accordance with the invention, in which.

DESCRIPTION OF THE PREFERRED EMBODIMENT

Figure 1:
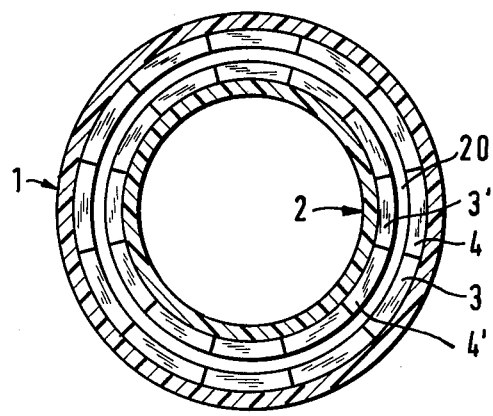
FIG. 1 is a diagrammatic cross sectional view of two cylindrical magnetic rings (magnetic cylinders) of the permanent magnetic synchronous drive clutch of a permanent magnet type pump.
Figure 2:
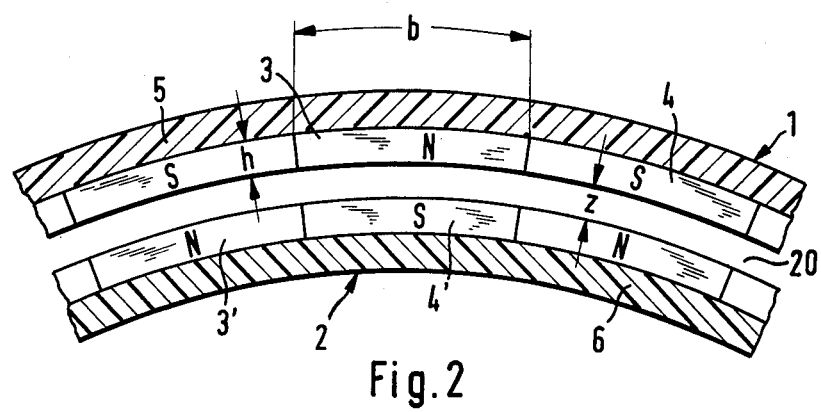
FIG. 2 is an enlarged partial elevation of the magnetic rings shown in FIG. 1.

FIGS. 1 and 2 illustrate the structure of a composed magnetic cylinder 1 of an exterior rotor and of a coaxial composed magnetic cylinder 2 of an interior rotor of a permanent magnet type pump, the gap tube being omitted from the drawing. On each magnetic cylinder there is provided a ring of an even number of thin permanent magnet plates of alternating polarity which are magnetized radially. The use of a magnetic material of alloys of cobalt with rare earths permits the required optimum dimensions of the magnet. The magnet plates 3 and 3' form a magnetic north pole and the magnetic plates 4 and 4' which are adjoining them without any spacing each form a magnetic south pole. The magnet plates 3 and 4 of the exterior rotor are embedded in contiguous relationship without any spacing in a drum 5, while the magnet plates 3' and 4' of the interior rotor are embedded contiguously in a drum 6. The drums may be made from plastics or light metal.

Figure 3:
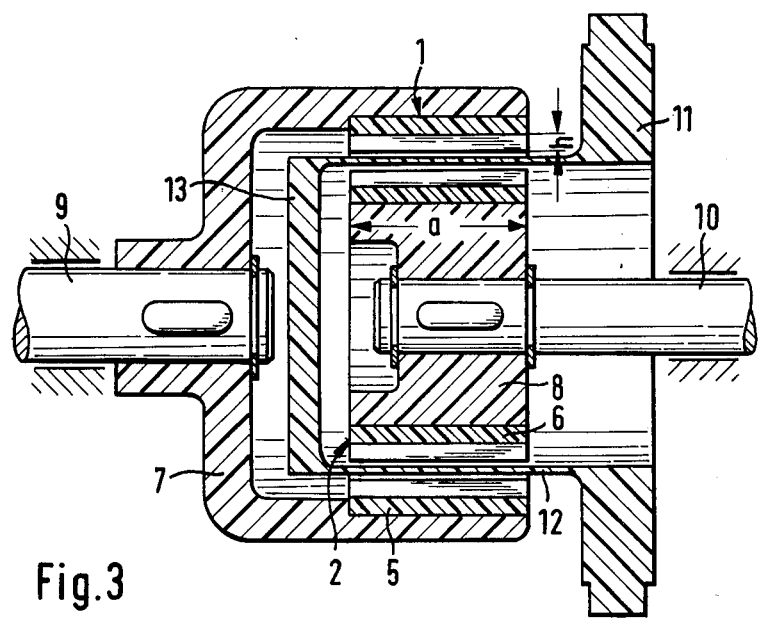
FIG. 3 is a diagrammatic longitudinal sectional view of the permanent magnetic drive clutch of a centrifugal pump without stuffing box.

Between the magnet cylinders 1 and 2 an air gap 20 having a thickness $z$, is defined to receive a cylindrical gap tube 12, as may be seen from FIG. 3. The magnet width $b$ extending in the direction of rotation, as seen in FIG. 2, is much larger than the magnet length $h$ which extends radially or in the direction of the extension of the thickness of the air gap 20. This has the advantage of permitting sufficiently large amounts of permanent magnet material to be accommodated in the magnet rings or magnet cylinders and of saving twenty times the weight at the same time. The magnet length $h$ is somewhat larger than the thickness $z$ of the air gap 20.

FIG. 2 is a partial section of the structure of the magnetic rings 1 and 2. The magnet plates 3 and 4' as well as 4 and 3' of magnetic rings 1 and 2 attract each other mutually so that when the exterior rotor is rotating with respect to the interior rotor, the torque which is being transmitted first rises, then passes a maximum value and, finally, drops again. The transmittable torque is augmented by the influence of the repellent action of magnets 3 and 3' as well as magnets 4 and 4'.

FIG. 3 shows the known structure of a driving clutch of a permanent magnet type gap-tube pump having an interior rotor 8 which carries a cylindrical magnetic ring 2 on its outer circumference. The interior rotor 8 is connected by means of a pump impeller shaft 10 for rotation with a one-stage or multi-stage pump impeller (not shown). The interior rotor and the pump impeller are housed in a space which is hermetically sealed off toward the exterior by a gap tube can 11. The cylindrical tube 12 of this can extends into the air gap between the interior rotor 8 and an exterior rotor 7 mounted on a drive shaft 9 and carrying the cylindrical magnetic ring 1. Between the opposed radial surfaces of the interior and exterior rotors, the can is closed by a gap tube can bottom 13.

Figure 4:
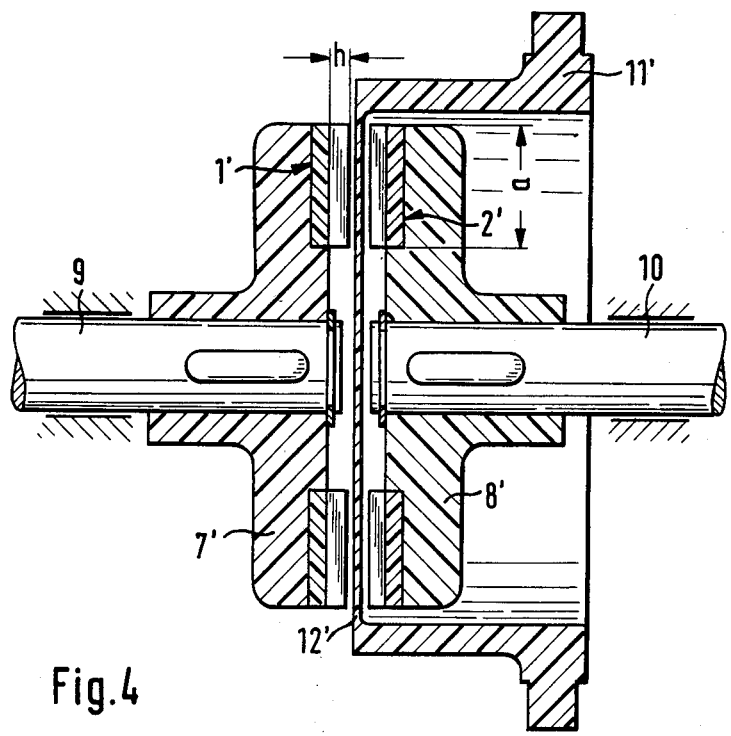
FIG. 4 is a diagrammatic longitudinal sectional view of a modified form of the drive clutch having radial operating faces of a centrifugal pump without stuffing box.

In the embodiment of the permanent magnetic drive clutch shown in FIG. 4, the planar magnetic discs 1' and 2' define a planar radial air gap between them. A planar partition 12' formed of non-magnetizable metallic material or, preferably, of plastics which is integral with the gap tube can 11', extends into this gap. The exterior rotor 7' and the interior rotor 8' are essentially disc-shaped.

It will be understood that while the invention has been shown and described in a preferred form, changes may be made without departing from the scope of the invention as defined in the following claims.

What is claimed is:

1. A light-weight permanent magnet type pump having a pump impeller shaft and a permanent magnet drive means therefor, said drive means comprising an interior rotor fixed to the pump impeller shaft, an exterior rotor mounted for rotation closely adjacent the interior rotor with an air gap therebetween, said interior rotor being adapted to receive a drive torque of at least 1 m·kg transmitted in synchronism by said exterior rotor, said pump impeller shaft and said interior rotor being housed and supported in a single sealed chamber, a partition of non-magnetizable material extending through said air gap and closing said chamber, a closed ring on each of the opposed surfaces of said interior and exterior rotors, each of said closed rings being formed by the same even number of permanent magnets of alternating polarity and embedded in a non-magnetizable material in side-by-side contiguous array, each of said magnets being a relatively thin magnetic plate formed of a magnetic material containing alloys of cobalt and rare earths and magnetized in the direction of the thickness of said air gap, said magnets each having a magnet length, extending in the direction of thickness of said air gap, which is somewhat larger than the air gap thickness, each of said magnets having a magnet width, extending in the direction of rotation, which is larger than said magnet length.

2. A permanent magnet type pump as claimed in claim 1 in which both said interior rotor and exterior rotor have a cylindrical configuration with the interior rotor nested within the exterior rotor.

3. A permanent magnet type pump as claimed in claim 1 in which said inner rotor and outer rotor have facing planar surface each carrying its array of permanent magnets.

4. A permanent magnet type pump as claimed in claim 1, wherein the magnet height extends perpendicularly to the magnet length, and the magnet width is several times the magnet length.

5. A permanent magnet type pump as claimed in claim 1, wherein said magnetic plates abut each other in the direction of the magnet height $a$.

6. A permanent magnet type pump as claimed in claim 1 wherein said partition has a high specific electrical resistance.

7. A permanent magnet type pump as claimed in claim 1 wherein said partition is made from a plastic material.

8. A permanent magnet type pump as claimed in claim 1 wherein said magnet arrays provide an even number of pole pairs between 6 and 36.

* * * * *